US009299990B2

(12) United States Patent
Hasegawa

(10) Patent No.: US 9,299,990 B2
(45) Date of Patent: Mar. 29, 2016

(54) FUEL CELL

(75) Inventor: Hajime Hasegawa, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 404 days.

(21) Appl. No.: 12/988,329

(22) PCT Filed: Oct. 29, 2009

(86) PCT No.: PCT/JP2009/068945
§ 371 (c)(1),
(2), (4) Date: Oct. 18, 2010

(87) PCT Pub. No.: WO2010/064518
PCT Pub. Date: Jun. 10, 2010

(65) Prior Publication Data
US 2011/0039188 A1 Feb. 17, 2011

(30) Foreign Application Priority Data
Dec. 1, 2008 (JP) .................................. 2008-306296

(51) Int. Cl.
*H01M 4/88* (2006.01)
*H01M 8/02* (2006.01)

(52) U.S. Cl.
CPC .......... *H01M 4/8807* (2013.01); *H01M 8/0213* (2013.01); *H01M 8/0221* (2013.01); *H01M 8/0226* (2013.01); *H01M 8/0247* (2013.01); *Y02E 60/50* (2013.01); *Y02P 70/56* (2015.11)

(58) Field of Classification Search
CPC ... Y02E 60/50; H01M 8/0267; H01M 8/0258
USPC ........................................................ 429/514
See application file for complete search history.

(56) References Cited

U.S. PATENT DOCUMENTS 6,562,507 B1 5/2003 Cisar et al.
6,803,139 B2 10/2004 Saito et al.
(Continued)

FOREIGN PATENT DOCUMENTS

CN 101064366 10/2007
DE 11 2006 002 324 T5 7/2008
(Continued)

OTHER PUBLICATIONS

International Search Report in International Application No. PCT/JP2009/068945; Mailing Date: Mar. 18, 2010.
(Continued)

*Primary Examiner* — Ula C Ruddock
*Assistant Examiner* — Archer Dudley
(74) *Attorney, Agent, or Firm* — Finnegan, Henderson, Farabow, Garrett & Dunner, LLP

(57) ABSTRACT

Through enhancement of productivity in a gas flow-path formation member, rising of production cost and deterioration of productivity of a cell that contains the gas flow-path formation member in cell components of the cell are prevented. A porous board 32 as a gas flow-path formation member that is individually formed from a separator is a molded piece containing carbon powder as raw materials, whereby possibilities of corrosion in an inner cell environment are naturally lower than the metallic-made. Further, since necessary conductivities are securable by carbon itself, additional treatments such as gilding for improvement of conductivity are not required. Moreover, because a plurality of openings of the porous board 32 are regularly arranged, forming either a tortoise-shell formed mesh 22 or lozenge-formed mesh 26, the porous board 32 can be easily molded with a mold 30 and can be accurately formed with high precision even in mass production. Still further, removal of burrs 34 and expansion of surface roughness are performable to the porous board 32 through an identical process following molding.

4 Claims, 8 Drawing Sheets

(56) References Cited

U.S. PATENT DOCUMENTS

| | | | |
|---|---|---|---|
| 2004/0058229 A1 | 3/2004 | Beattie et al. | |
| 2004/0197633 A1* | 10/2004 | Yamamoto | H01M 8/0226 429/434 |
| 2005/0130022 A1 | 6/2005 | Tanno et al. | |
| 2005/0221146 A1* | 10/2005 | Horiguchi | H01M 8/0254 429/456 |
| 2007/0126137 A1 | 6/2007 | Zhamu et al. | |

FOREIGN PATENT DOCUMENTS

| | | | |
|---|---|---|---|
| DE | 11 2006 002 851 T5 | 10/2008 | |
| EP | 1 406 327 A1 | 4/2004 | |
| JP | 2007-26812 | 2/2007 | |
| JP | 2007026812 * | 2/2007 | H01M 8/02 |
| JP | 2007-149467 | 6/2007 | |
| JP | 2007-188834 | 7/2007 | |
| JP | 2008-146947 | 6/2008 | |
| JP | 2008-300323 | 12/2008 | |

OTHER PUBLICATIONS

Written Opinion of the International Searching Authority in International Application No. PCT/JP2009/068945; Mailing Date: Mar. 18, 2010.

Technical Disclosure Bulletin of 2008-500025, Summary of Art dated Jan. 7, 2008.

* cited by examiner

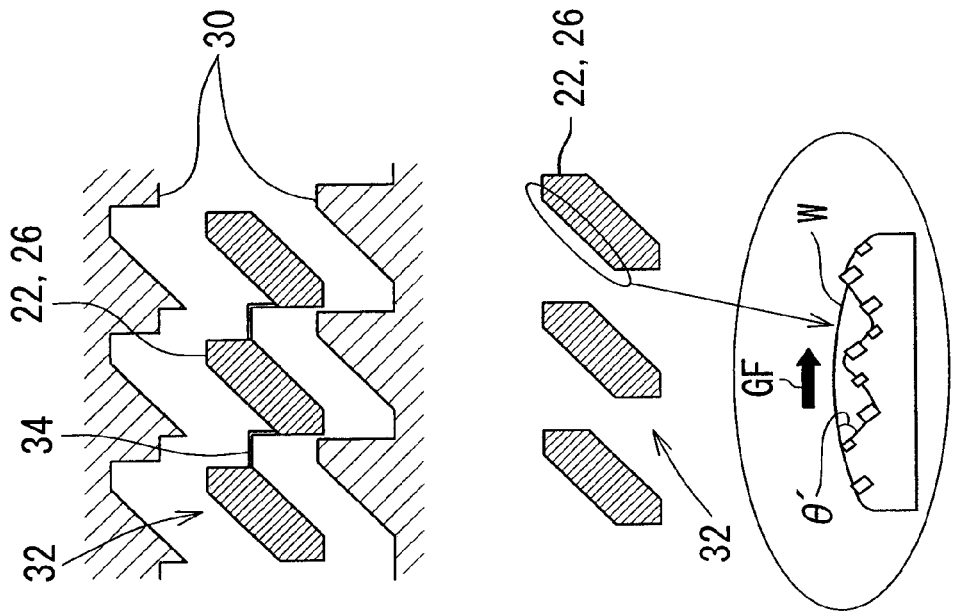
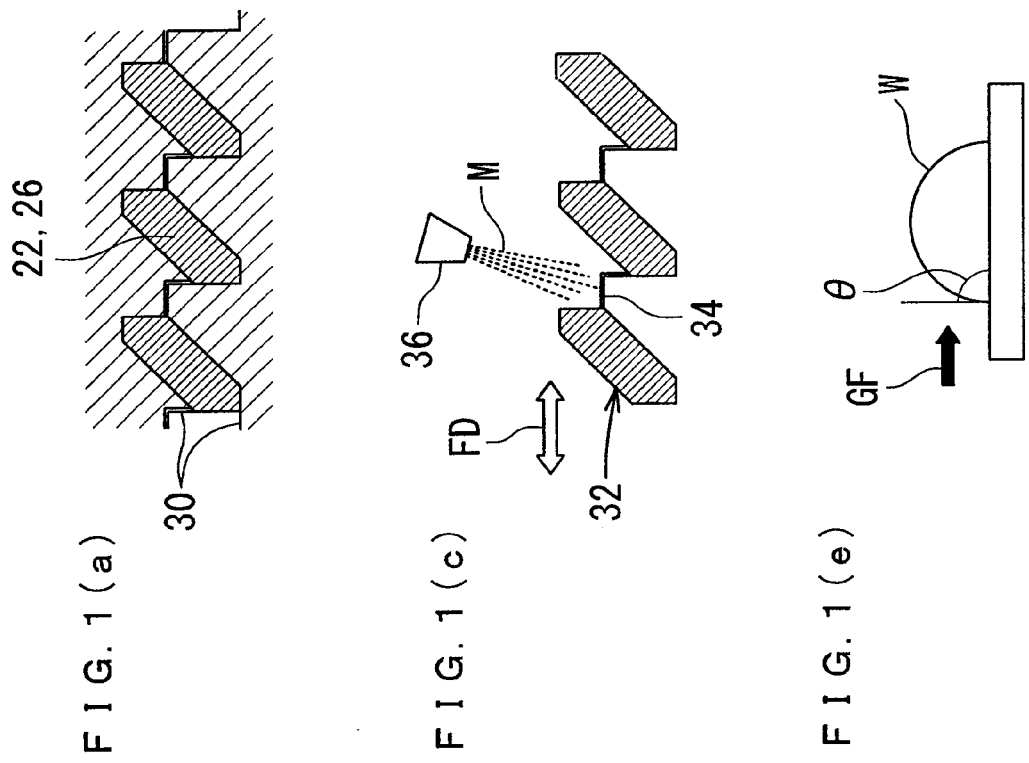

F I G. 4
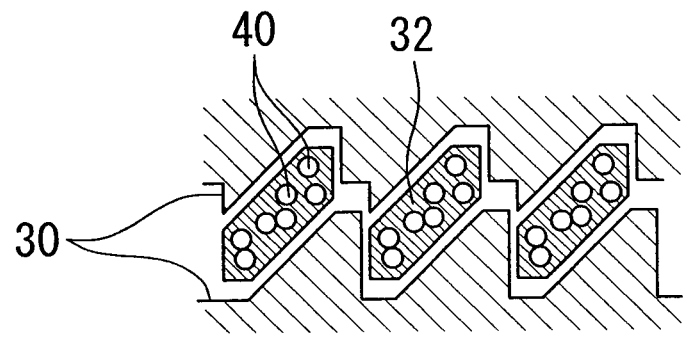
F I G. 5 (a)
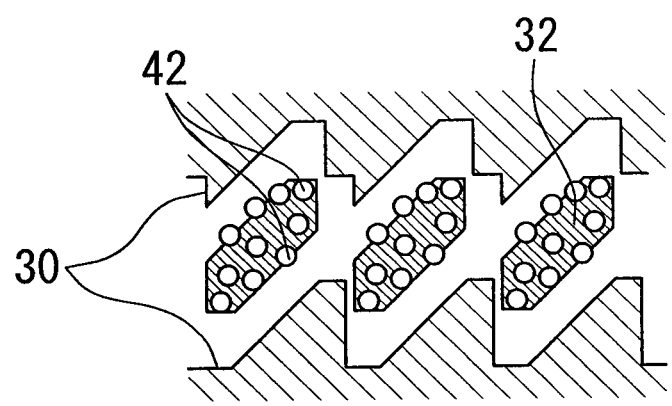
F I G. 5 (b)
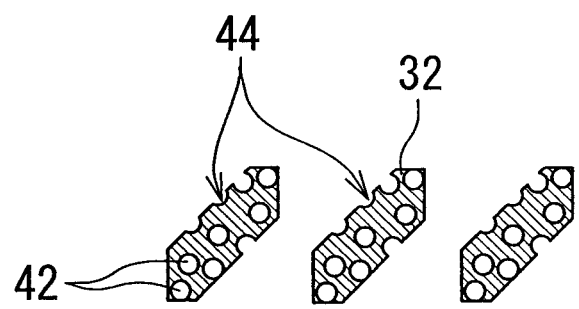

F I G. 9(a)
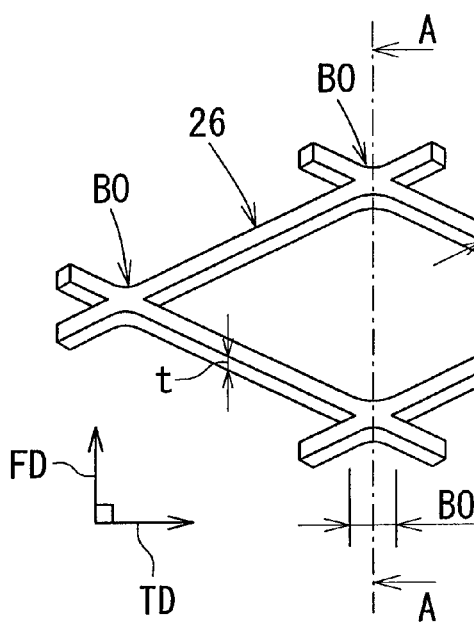
F I G. 9(b)
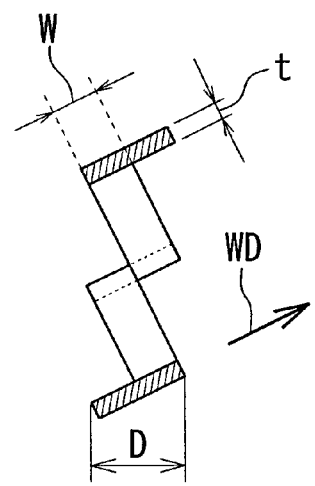
F I G. 9(c)
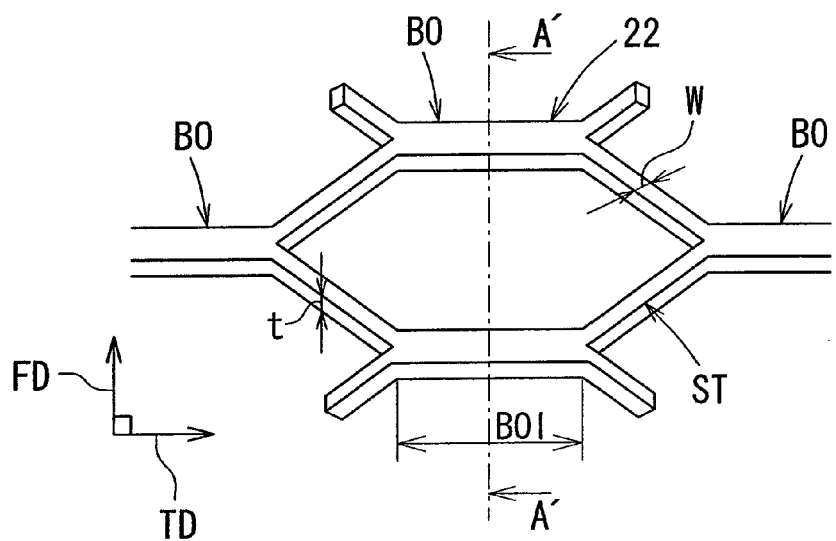

FUEL CELL

CROSS-REFERENCE TO RELATED APPLICATIONS

This application is a national phase application of International Application No. PCT/JP2009/068945, filed Oct. 29, 2009, and claims the priority of Japanese Application No. 2008-306296, filed Dec. 1, 2008, the contents of both of which are incorporated herein by reference.

TECHNICAL FIELD

The present invention relates to a fuel cell.

BACKGROUND ART

In a fuel cell, a cell (unit cell) 10 as shown in FIG. 7 is fabricated with plural kinds of cell components to be laminated, and a plural number of the cells 10 are laminated so as to form a stacked construction thereby securing necessary voltages. Normally, at quadrilateral peripheral edges of the cell 10, the external contour of which is rectangular, fuel gas is supplied to its anode side while oxidizing agent is supplied to its cathode side, and manifolds 10a, 10b are formed for discharging unreacted gas or produced water generated in the cell.

Here, in FIG. 8, one example of a cell construction of a polymer electrolyte fuel cell as shown in FIG. 7 is introduced. In the cell 10, a membrane electrode assembly (hereinafter referred to as "MEA") 12 is arranged at the center of the cell 10 in its thickness direction, and on the both sides of the MEA 12, gas diffusion layers 14, 14 (gas diffusion layers 14A and 14C on an anode side and a cathode side), gas flow-path formation members 16, 16 (gas flow-path formation members 16A and 16C on an anode side and a cathode side), and separators 18, 18 (separators 18A, 18C on an anode side and a cathode side) are each arranged in this order. Moreover, MEA where the MEA 12 and the gas diffusion layer 14 are integrally formed may be called as Membrane Electrode & Gas Diffusion Layer Assembly (MEGA). Further, in the cell 10 as shown in FIG. 8 where the gas flow-path formation member 16 is formed separately from the separator 18, expanded metals or sintering madreporites are conventionally applied for the gas flow-path formation member 16 so as to function as the above-described separators (see, for example, Patent Document 1 and Patent Document 2).

In the expanded metals applied for the gas flow-path formation member 16 of the cell 10, for example, a lozenge-formed mesh 26 as shown in FIG. 9(a) or a tortoise-shell formed mesh 22 as shown in FIG. 9(c) continuously forms in a so-called zigzag arrangement. In an expanded metal 20, since the meshes 22, 26 are formed through manufacturing procedures (hereinafter explained in details) that a flat sheet material is fed to a die so as to cut the flat sheet material one layer by one layer, each of the meshes 22, 26 is fabricated connecting to each other in a stepped formation in Materials Forwarding Direction (hereinafter referred to as "FD direction" if appropriate). Generally, as shown in FIG. 9, a crossed portion of the mesh constructing the expanded metal is called as a bond portion BO, and a portion connecting between the bond portions BO is called as a strand portion ST. Further, the thickness of the strand portion ST is called as a shearing width (or feeding width) W, and the shearing width direction of the mesh is called as "WD direction." In figures, a reference symbol t is referred to as the plate thickness of the materials while a reference symbol D is the overall thickness of the meshes 22, 26. The mesh with a long bond length BOl of the bond portion BO is the tortoise-shell formed mesh 22 while the mesh with a short bond length BOl of the bond portion BO is the lozenge-formed mesh 26. Here, since the sectional configuration of the lozenge-formed mesh 26 (A-A section) and the sectional configuration of the tortoise-shell formed mesh 22 (A'-A' section) are identical, the sectional configuration of each of the meshes is shown in FIG. 9(b).

Furthermore, as shown in FIG. 10, since the mesh 22 (26) of the expanded metal 20 is arranged so as to incline relative to the gas diffusion layer 14 and the separator 18, triangular gas passages 24, which are diagonal-line areas in FIG. 10, are formed in a zigzag manner between the mesh 22 (26) in zigzag arrangement and the faces of both the gas diffusion layer 14 and the separator 18. Accordingly, gas flowing into the gas flow-path formation members 16 sequentially moves through the triangular gas passages 24 arranged in zigzag so as to flow in the FD direction. Here, a gas flow GF will be, as shown in FIG. 11, oscillated in a direction orthogonal to the FD direction (Transverse Direction or Tool Direction: hereinafter referred to as "Tool Feeding Direction" or "TD Direction" if appropriate) so that the gas flow GF repeats flow at very fine turns.

Still further, in order to prevent fuel gas or oxidizing agent from being leaked into the cell 10, if necessary, the MEA 12, the gas diffusion layer 14 and the gas flow-path formation member 16 are sealed with a gasket 28 typically shown in FIG. 12, nearby the manifolds 10a, 10b (see FIG. 7). The gasket 28 is made of an elastic material such as rubber, and in a condition where the expanded metals 20, each of which is composed of the MEA 12, the gas diffusion layer 14 and the gas flow-path formation member 16, are laminated, the gasket 28 is integrally formed so as to cover the external edges of the expanded metals 20.

In a sub-assembly structure in which to be sealed by the gasket 28, the MEA 12 and the gas diffusion layer 14 are not extended up to external edges at which the manifold 10a of the cell 10 is provided (the portions indicated by reference symbol S in FIG. 7), but only the expanded metal 20 concurrently functioning as a reinforcing material of the cell 10 is extended up to the external edges at which the manifold 10a of the cell 10 is provided. As shown typically in FIG. 12, the expanded metal 20 is covered by the gasket 28.

[Patent Document 1]
  Japanese Patent Application Laid-open No. 2007-26812
[Patent Document 2]
  Japanese Patent Application Laid-open No. 2007-188834

DISCLOSURE OF THE INVENTION

Problem to be Solved by the Invention

Here, in case that the expanded metal 20 which is metallic parts is applied as a component of the gas flow-path formation member 16, it would be necessary to improve anti-corrosiveness or conductivity of the expanded cell 20 making further acceptable to an inner cell environment and would be preferable to add surface treatments aiming at these improvements. However, those additional processes will cause increase of production cost or decrease of productivity with respect to the cell 10. Further, due to electrochemical reactions within the cell, produced water generated at a cathode side electrode will pass the gas diffusion layer 14 (14C) and travel along the mesh 22 of the expanded metal 20 constructing the gas flow-path formation member 16 (16C). The produced water then travels along the surface of the separator 18 (18C) toward the manifolds of gas discharge edges through space where the gas flow-path formation member 16 is arranged. The produced water is then discharged outside the cell 10. Here, as shown in FIG. 10, the produced water may remain at the triangular gas passages 24 formed between the meshes 22 and the separator 18C. The stay of the produced water at the gas passages 24 is caused due to the arrangement that the mesh 22 is placed at an acute angle relative to the surface of the separator 18 whereby the triangular gas passages 24 will obtain retentivity of water (capillary forces). The stay of the produced water as discussed above will lower drainage performance and decrease flow path cross-section of the gas flow-path formation member 16C on the cathode side resulting in increase of gas pressure loss. Accordingly, these will cause performance deterioration of the fuel cell.

Still further, in case of manufacturing the sub-assembly structure in which to be sealed by the gasket 28, the components of the gasket 28 may travel along the continuously-formed meshes 22 of the expanded metal 20 and infiltrate into areas further center portion where the MEA 12 and the gas diffusion layer 14 are arranged, the center portion contributing to generation of power. This may cause the reduction of electrode areas and the deterioration of gas diffusibilities whereby the power generation performance of the cell 10 may be negatively influenced. These problems discussed above can be also applied to cells where conventional sintering madreporites are used as the gas flow-path formation member 16.

The present invention has been made in light of the above, and it is an object of the present invention to provide a gas flow-path formation member where the productivity of which is advanced thereby preventing production costs of a cell from arising and productivities of the cell from deteriorating, the cell including the gas flow-path formation member within components of the cell. Further, it is also another object of the present invention to provide the gas flow-path formation member in which to prevent drainage from deteriorating and to prevent a flow path cross-section from diminishing thereby deterring increase of gas pressure loss, which prevents performance of fuel cells from deteriorating. Still further, in case that sub-assembly structures sealed by the gasket are fabricated, components of the gasket are prohibited from infiltrating into further center portion by traveling along openings of the gas flow-path formation member, the center portion contributing to generation of power. Accordingly, the present invention can prevent power generation performances from deteriorating due to the reduction of electrode areas and the decline of gas diffusibilities.

Means for Solving the Problem

Embodiments of the Present Invention

Embodiments of the present invention below exemplify the framework of the present invention and are recited by items for better understanding of the present invention. Each of the items should not be taken as limitation to technical scopes of the present invention, but rather in consideration of the best mode for carrying out the present invention, partial substitution or deletion of components of each item, or addition of other components to the item should be included in technical scopes of the present invention.

(1) A fuel cell with a cell structure including: a separator; and a gas flow-path formation member individually provided from the separator, the gas flow-path formation member being arranged within a cell component including the separator, wherein the gas flow-path formation member is a molded piece containing carbon powder as raw materials, the gas flow-path formation member being a porous board having a plurality of openings that are regularly arranged at least in a gas flow direction.

In the fuel cell recited in the item (1), the gas flow-path formation member individually provided from the separator is the molded piece containing the carbon powder as raw materials whereby possibilities of corrosion in the inner cell environments become low. Further, since necessary conductivities can be secured by carbon itself, additional treatments such as gilding for improving conductivities will not be required. Moreover, because the plurality of openings of the porous board of the gas flow-path formation member are regularly arranged at least in the gas flow direction, the porous board can be easily formed through molding. Still further, the porous board can be accurately formed with high precision even in mass production.

(2) In the fuel cell according to the item (1), the gas flow-path formation member is a molded piece containing binder as raw materials (Claim 1).

In the fuel cell recited in the item (2), the gas flow-path formation member is a molded piece containing the carbon powder and the binder as raw materials and formed as that molten materials containing the carbon powder (a major component) and the binder are injected into an injection mold. On the other hand, a sheet of pre-forming material containing the carbon powder (a major component) and the binder is formed, and the pre-forming material is molded by a thermal mold so as to form the porous board provided with the plurality of openings regularly arranged at least in the gas flow direction. This porous board is applied as the gas flow-path formation member of the cell. Here, materials such as phenolic resin, which are less deformed by thermal stress and excellent in corrosion resistance within the inner cell environments, are applicable as the raw materials of the binder.

(3) In the fuel cell according to the items (1) or (2), removal of burrs and expansion of surface roughness are performable to the gas flow-path formation member through an identical process following molding (Claim 2).

In the fuel cell recited in the item (3), since the removal of burrs and the expansion of surface roughness are performable to the gas flow-path formation member through an identical process following molding, these burrs can be removed at the final stage even if the burrs have been produced at the openings during molding. Accordingly, the flow inhibition of gas can be prevented, and the deterioration of drainage to produced water can be also avoided.

Further, tunings to the mold at high precision will not be necessary in order to entirely eliminate the generation of the burrs during molding. Still further, since the surface roughness of the porous board as the gas flow-path formation member is expanded, hydrophilicity of the surface of the porous board will be improved, also contributing to improvement of drainage of the produced water. Here, concrete methods to conduct removal of the burrs and expansion of the surface roughness through an identical process may be liquid honing or shot blasting.

(4) In the fuel cell according to the items (1) to (3), the openings are formed as that an aperture ratio of the openings defined by a certain region that extends from the most external edges of the gas flow-path formation member to slightly the center is set to be smaller than other areas (Claim 3).

In the fuel cell recited in the item (4) where a gasket seals the circumference of the gas flow-path formation member, the gasket is formed in such a manner as to cover the areas where the aperture ratio of the openings is smaller than other areas. Accordingly, components of the gasket is prevented from traveling along the plurality of openings of the gas flow-path formation member so as to infiltrate into further center areas contributing to generation of electricity of the gas flow-path formation member. In addition, the aperture ratio is adjustable by forming a mold in such a manner as to reduce or eliminate the areas of the openings or the number of openings at the periphery of the gas flow-path formation member.

(5) In the fuel cell according to the items (1) to (3), the openings are formed as that an aperture ratio of the openings defined by a certain width at a predetermined distance from the most external edges of the gas flow-path formation member is set to be smaller than other areas (Claim 4).

In the fuel cell recited in the item (5) where a gasket seals the circumference of the gas flow-path formation member, the gasket is formed from the external edges of the gas flow-path formation member up to the area where the aperture ratio is small. Accordingly, components of the gasket are prevented from traveling along the plurality of openings of the gas flow-path formation member so as to infiltrate into further center areas contributing to generation of electricity. Further, at an outer area surrounding the certain width having a small aperture ratio, components of the gasket are integrally solidified. This so-called anchor effect will improve adhesiveness between the gas flow-path formation member and the gasket.

(6) In the fuel cell according to the items (1) to (5), the gas flow-path formation member contains conductive metal powder as raw materials.

In the fuel cell recited in the item (6), the conductive metal powder will improve conductivity of the gas flow-path formation member so as to reduce specific resistance of the gas flow-path formation member. Accordingly, additional treatments such as plating for advancing conductivity will not be necessary. Moreover, since there will be no case that the conductive metal powder contained in the gas flow-path formation member is directly in touch with the inner cell environments, property alteration due to corrosion, etc. will never be caused. Here, the conductive metal powder used in the item (6) may be Au, Pt, Ag, Cu, Fe, Cr, Ni or alloy based on these indicated metals.

(7) In the fuel cell according to the items (1) to (6), the gas flow-path formation member contains materials of metal or metallic oxide as raw materials in which to be dissolved in inner cell environments. In the inner cell environments recited in the item (7), the metal or the metallic oxide contained in raw materials will be dissolved under the inner cell environments so as to expand the surface roughness of the gas flow-path formation member, contributing to advancement of hydrophilicity thereby improving the drainage of produced water. Here, materials applicable to the conductive metal powder discussed hereinabove will be used for those metals or metallic oxide; however, Au and Pt are not going to be dissolved under the inner cell environments, so that they should be excluded, and Fe would be excluded if it gives negative effects to electrochemical reactions.

(8) In the fuel cell according to the items (1) to (7), electrical insulating manifold formation materials are connected to external edges of the gas flow-path formation member.

In the fuel cell recited in the item (8), according to rigidity of the manifold formation materials fixed to the external edges of the gas flow-path formation member, rigidity of the cell as a whole will be secured. Further, since the manifold formation materials possess insulating properties, it is possible to prevent the gas flow-path formation member and other cell components from being improvidently shot-circuited through the manifold formation materials. Here, in the item (8), the gasket is formed so as to cover both the gas flow-path formation member and the manifold formation materials.

Effects of the Invention

The present invention thus constructed will improve productivity of the gas flow-path formation member, so that production-cost increase or productivity decline for the cell including the gas flow-path formation member can be prevented. Further, it is possible to prevent drainage of the gas flow-path formation member from deteriorating and to prevent the flow-path cross section of the gas flow-path formation member from diminishing, preventing gas pressure loss from increasing. Accordingly, performance of the fuel cell as a whole can be prevented from being deteriorated. Still further, when molding the gasket, the components of the gasket can be prevented from traveling along the openings of the gas flow-path formation member and infiltrating into further center areas contributing to generation of electricity. Accordingly, the present invention can prevent power generation performances from deteriorating due to reduction of electrode areas and decline of gas diffusibilities.

BRIEF DESCRIPTION OF THE DRAWINGS

FIGS. 1(a) to 1(e) are explanatory drawings of a fuel cell according to a first embodiment of the present invention wherein a porous board applied to a gas flow-path formation member is shown along with manufacturing processes. FIG. 1(a) is when the porous board is molded; FIG. 1(b) is when a mold is opened; FIG. 1(c) is when burrs are removed and surface roughness is expanded; FIG. 1(d) is a main sectional view showing the porous board in a finished state; and FIG. 1(e) is a schematic diagram as reference wherein a contact angle between the porous board and water drop prior to the expansion process of the surface roughness is shown.

FIG. 2(a) is a plan view of the porous board; FIG. 2(b) is a plan view in a sub-assembly structure wherein peripheries of the porous board are sealed by a gasket; and FIG. 2(c) is a cross-sectional view taken along the line B-B in FIG. 2(b).

FIG. 3(a) is a plan view of the porous board; FIG. 3(b) is a plan view in a sub-assembly structure wherein peripheries of the porous board are sealed by a gasket; and FIG. 3(c) is a cross-sectional view taken along the line C-C in FIG. 3(b).

FIG. 4 is a sectional view of a fuel cell according to a fourth embodiment of the present invention wherein a porous board applied to a gas flow-path formation member is shown along with a mold in manufacturing processes.

FIGS. 5(a) and 5(b) illustrate a fuel cell according to a fifth embodiment of the present invention wherein a porous board applied to a gas flow-path formation member is shown. FIG. 5(a) is a sectional view of the porous board with a mold in manufacturing processes; and FIG. 5(b) is a sectional view of the porous board under inner cell environments.

FIG. 6(a) is a plan view wherein the porous board is fabricated in an integral manner with a manifold formation material; and FIG. 6(b) is a plan view in a sub-assembly wherein a gasket is formed at peripheries of the porous board.

FIGS. 9(a) to 9(c) are explanatory views designating each part of a conventional expanded metal constructing the cell components. FIG. 9(a) is a plan view of a lozenge-formed mesh; FIG. 9(b) is sectional view taken along the lines A-A and A'-A' in FIG. 9(a) and FIG. 9(c) respectively; and FIG. 9(c) is a plan view of a tortoise-shell formed mesh.

DESCRIPTION OF THE REFERENCE NUMERALS

10: Cell, 12: MEA, 14, 14A, 14C: Gas Diffusion Layer, 16, 16A, 16C: Gas Flow-path Formation Member, 18, 18A, 18C: Separator, 20: Expanded Metal, 22: Tortoise-shell Formed Mesh, 24: Gas Passage, 26: Lozenge-formed Mesh, 28: Gasket, 30: Mold, 32: Porous Board, 32b: a certain region that extends from the most external edges of a gas flow-path formation member to areas stretching slightly toward center, 32c: a certain width placed at external edges of a gas flow-path formation member but surrounded with an outer area, 34: burr, 38: manifold formation material, 40: conductive metal powder, 42: metal or metallic oxide powder as materials dissolved under inner cell environments, 44: hole

BEST MODES FOR CARRYING OUT THE INVENTION

Figure 7:
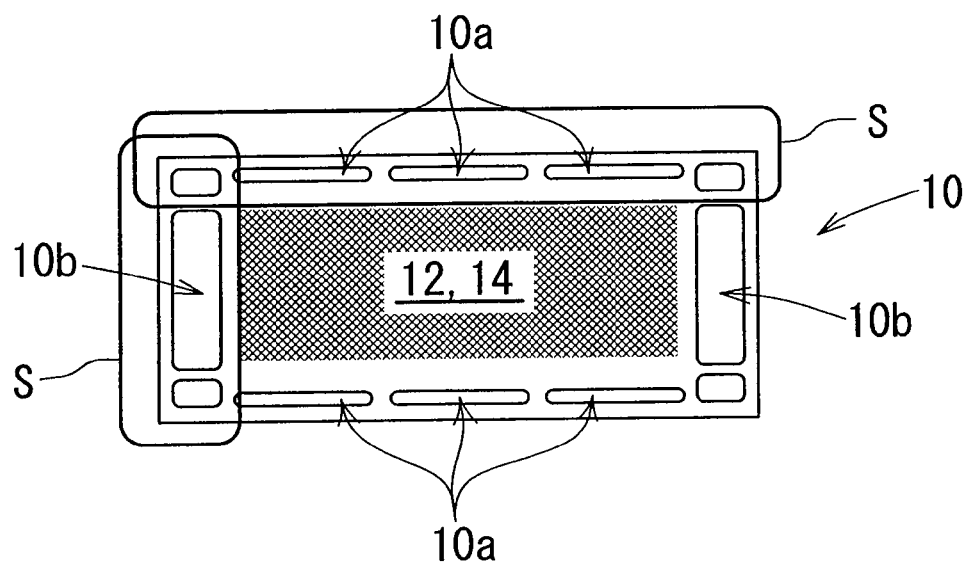
FIG. 7 is a plan view showing a conventional cell of a polymer electrolyte fuel cell.
Figure 8:
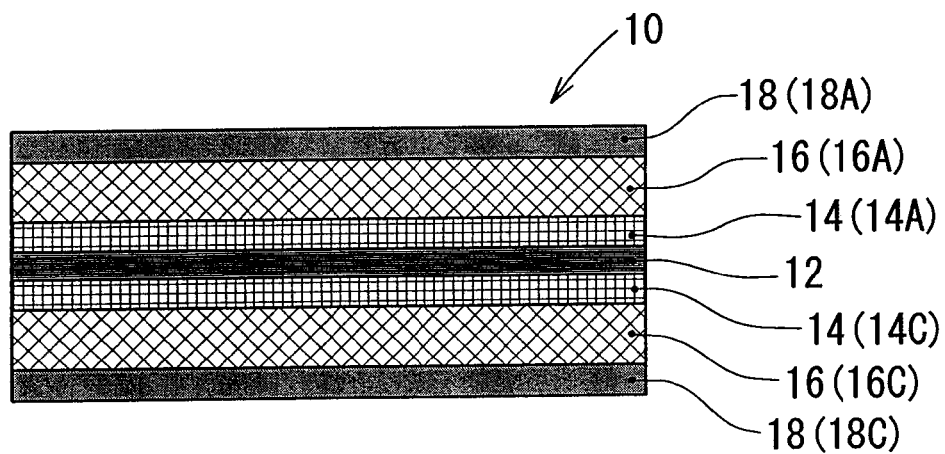
FIG. 8 is a sectional view wherein cell components of the cell shown in FIG. 7 are typically shown.
Figure 10:
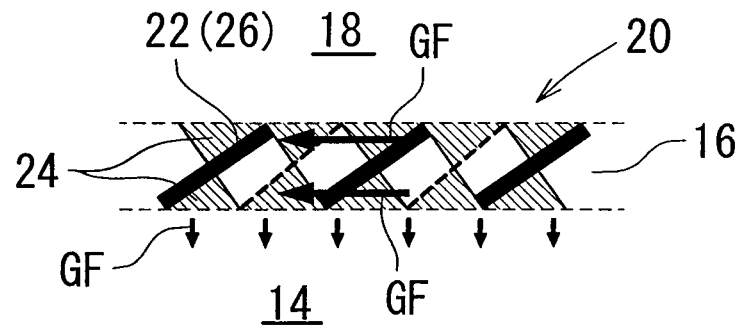
FIG. 10 is a sectional view of gas passages of a conventional cell where the expanded metal in FIG. 7 is applied.

Hereinafter, the best mode for carrying out the present invention will be explained with reference to the accompanying drawings. Here, explanations with respect to any components that are identical with or corresponding to prior arts will be omitted. First, in cell components of a fuel cell according to a first embodiment of the present invention, a gas flow-path formation member 16 is provided individually from a separator 18, as identical with the conventional cell 10 shown in FIGS. 7 and 8, and the gas flow-path formation member 16 is a molded piece containing carbon powder and binder (such as phenolic resin) as raw materials. Further, the gas flow-path formation member 16 is a porous board 32 provided with a plurality of openings regularly arranged at least in a gas flow direction. To be more specific, as the same with the tortoise-shell formed mesh 22, the lozenge-formed mesh 26 and the like of the gas flow-path formation member 16 using the expanded metal shown in FIGS. 9 to 11, the porous board 32 is formed to have the plurality of openings regularly arranged at least in the gas flow direction, or more specifically, at least either in a FD direction, in a TD direction or in a WD direction. Still further, manufacturing processes of the gas flow-path formation member are illustrated in FIG. 1 in a schematic manner.

That is, as shown in FIG. 1(a), dissolved materials containing carbon powder (as a main component) and binder are injected into an injection molding die, whereby the porous board 32 (the gas flow-path formation member 16) are formed, the porous board 32 such as the tortoise-shell formed mesh 22 or the lozenge formed mesh 26 being provided with the plurality of openings regularly arranged at least in the gas flow direction. On the other hand, it is possible to mold the porous board 32 in such a manner that sheet pre-forming materials containing carbon powder (as a main component) and binder are formed, and the pre-forming materials are then subjected to a thermal press molding with a mold 30. Here, in case where those manufacturing methods are applied, as shown in FIG. 1(b), when the mold 30 is opened, burrs 34 may be generated at openings of the porous board 32 molded.

Accordingly, as shown in FIG. 1(c), liquid honing or shot blasting is applied to the porous board 32 where the burrs 34 are generated. Here, it is possible to concurrently conduct removal of the burrs 34 as well as expansion of the surface roughness on the porous board 32 by relatively shifting an injection nozzle 36 of a media M and the porous board 32, for example, in the FD direction. In FIG. 1(d), the surface of either the tortoise-shell formed mesh 22 or the lozenge formed mesh 26 that constructs the porous board 32 is partially shown in an expanded view.

Figure 11:
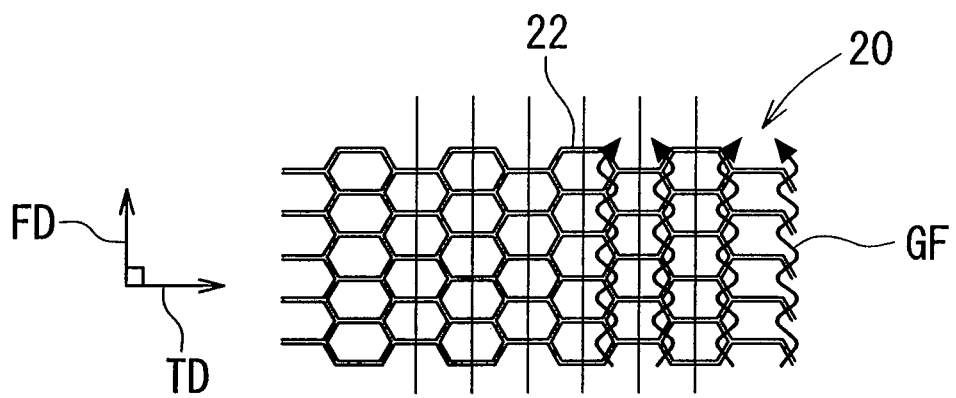
FIG. 11 shows the expanded metal arranged with the tortoise-shell formed mesh where the gas passages of the cell in FIG. 10 is formed, the expanded metal viewed in a shearing width direction of the mesh.
Figure 12:
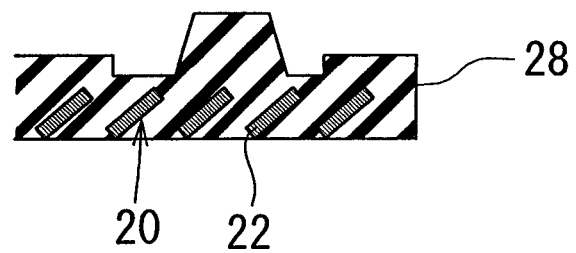
FIG. 12 is a sectional view illustrating a condition where the expanded metal is covered with a seal member at a place adjacent to external edges of the cell shown in FIG. 7.

According to the first embodiment of the present invention thus constructed, it will achieve the following functional effects. That is, since the porous board 32 is the molded piece containing the carbon powder and the binder as raw materials and is provided with the plurality of openings regularly arranged at least in the gas flow direction as the same with the gas flow-path formation member made of conventional expanded metals, a gas flow GF is, as shown in FIG. 11, oscillated in the TD direction and repeats very fine turns to flow either in the FD direction or in the WD direction. Accordingly, by advancing electrochemical reactions and smoothening drainage of produced water, it makes possible for the cell to effectively perform generation of electricity.

Moreover, since the porous board 32 that is individually formed from the separator is the molded piece containing the carbon powder as raw materials, possibilities of corrosion under the inner cell environments will naturally become lower than the metal-made. Still further, since necessary conductivities can be secured with the carbon by itself, additional treatments such as plating aiming at improvement of conductivity will not be necessary. In addition, since the plural numbers of openings of the porous board 32 as the gas flow-path formation member 16 are regularly arranged at least in the gas flow direction, the porous board 32 can be molded easily by the mold 30 and can be stably formed at high precision even in mass production.

Furthermore, since the porous board 32 constructing the gas flow-path formation member has been subjected to the removal of the burrs 34 and the expansion of the surface roughness through an identical process following molding, as shown in FIG. 1(b), even if the burrs 34 are generated at the openings during molding, these burrs 34 are removed at the final stage so as to prevent flow inhibition of the gas due to the burrs 34 and deterioration of the drainage of produced water. This means that the present invention allows the burrs 34 to be generated through molding to some extent, whereby the high-precision mold 30 does not need to be tuned for completely depressing the generation of the burrs.

In addition, since the surface roughness of the porous board 32 is expanded, hydrophilicity of the surface of the porous board 32 will be improved, also contributing to improvement of the drainage of produced water. To be more specific, the hydrophilicity of the surface of the porous board 32 is influenced by a contact angle between the surface and water drop W. As shown in FIG. 1(e), where the contact angle prior to the expanded treatments of the surface roughness is set to θ, and the contact angle following the expanded treatments of the surface roughness as shown in FIG. 1(d) is set to θ', the contact angle will get decreased (θ>θ') for the reason that the surface area of the porous board 32 will increase while the surface roughness thereof is more advanced. According to "Wenzel formula," an area expanded rate r (increase ratio from an original surface area to a surface area after convexo-concave formation has been provided) can be expressed based on cos θ'=r×cos θ. That is, by increasing the surface area with advancement of the surface roughness, the contact angle θ becomes small, whereby hydrophilicity is improved so as to reduce risk where stay of the produced water hampers the gas flow GF.

Figure 2A:
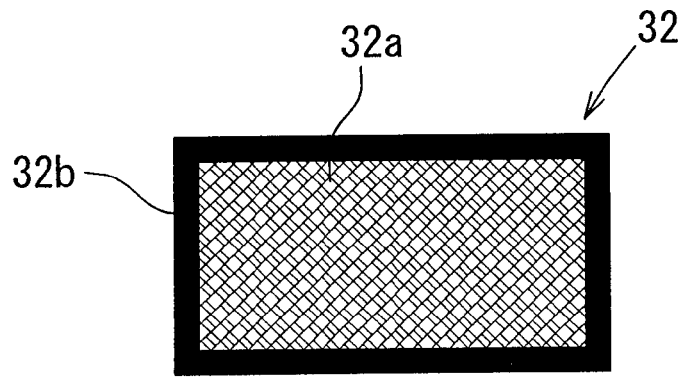
FIGS. 2(a) to 2(c) illustrate a fuel cell according to a second embodiment of the present invention wherein a porous board applied to a gas flow-path formation member is shown.

Hereinafter, a second embodiment of the present invention will be explained with reference to FIG. 2. Here, components identical with or corresponding to prior arts or the first embodiment are given the same reference symbols, and the detailed explanation thereof will be omitted. In the second embodiment of the present invention, when the porous board 32 constructing the gas flow-path formation member 16 according to the first embodiment of the present invention is formed, as shown in FIG. 2(a), openings are formed as that an aperture ratio of the openings defined by a certain region (or a certain width) 32b that extends from the most external edges of the porous board 32 to slightly the center is set to be smaller than other areas (or an inner area) 32a.

Here, if the certain region 32b extending from the most external edges of the porous board 32 to slightly the center occupies relatively large areas, areas contributing to generation of electricity (the inner area 32a) become small. In view of the above, since a gasket 28 is formed to cover the certain region 32b, the details of which is discussed hereinbelow, it is preferable that the certain region 32b has width where at least the gasket 28 can be suitably fit (for example, 3 to 5 mm). Moreover, the aperture ratio is adjustable based on the configuration of a die which molds the porous board 32 in such a manner as to reduce or delete the areas or the number of openings on the certain region 32b.

Figure 2B:
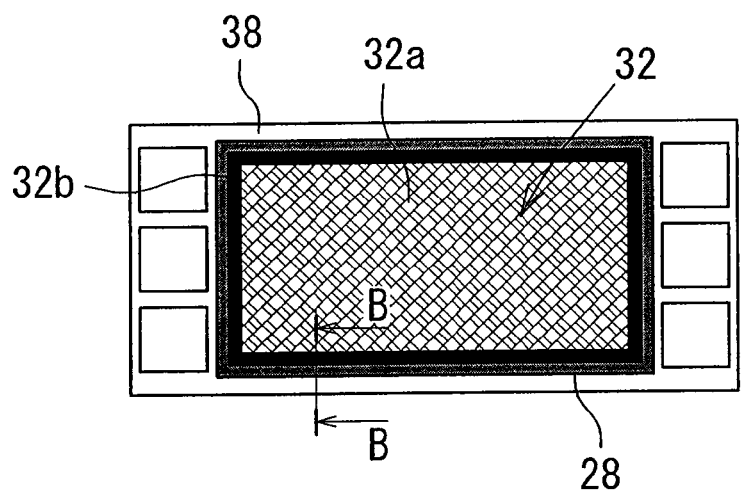
Figure 2C:
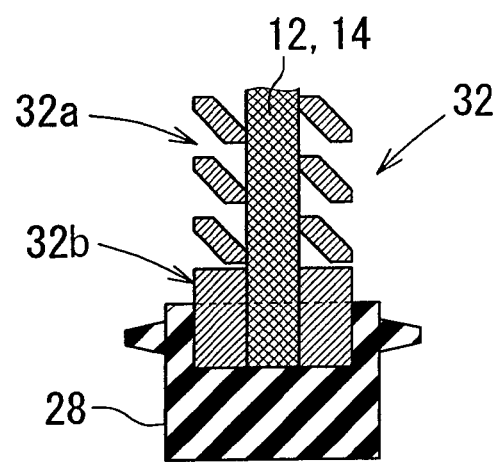

Further, according to the second embodiment of the present invention, as shown in FIGS. 2(b) and 2(c), in a case where a sub-assembly structure that seals peripheries of the porous board with the gasket 28 is provided, the gasket 28 is formed so as to cover the certain region 32b where the aperture ratio is small. Accordingly, it is possible to certainly prevent that components of the gasket 28 travel along the plurality of openings of the gas flow-path formation member and infiltrate into the inner area 32a where the MEA 12 and the gas diffusion layer 14 contributing to generation of electricity are arranged. It is therefore possible to prevent electrode areas from diminishing and to prevent gas diffusibilities from deteriorating so as to circumvent cell performance degradation in electric generation. Here, explanations of operational effects identical with the first embodiment of the present invention will be omitted. Portion identified by a reference symbol 38 in FIG. 2(b) is insulated manifold formation materials optionally fixed to the external edges of the porous board 32 (to be interpreted in the same manner hereinbelow).

Figure 3A:
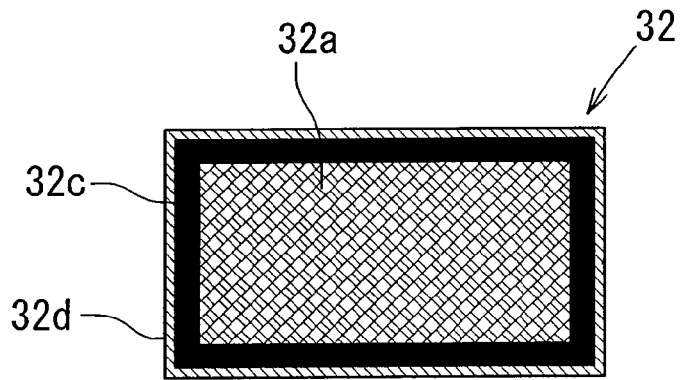
FIGS. 3(a) to 3(c) illustrate a fuel cell according to a third embodiment of the present invention wherein a porous board applied to a gas flow-path formation member is shown.

Next, a third embodiment of the present invention will be explained with reference to FIG. 3. Here, components identical with or corresponding to prior arts or the first and second embodiments are given the same reference symbols, and the detailed explanation thereof will be omitted. In the third embodiment of the present invention, when the porous board 32 constructing the gas flow-path formation member 16 according to the first embodiment of the present invention is formed, as shown in FIG. 3(a), openings are formed as that an aperture ratio of the openings defined by a certain width 32c at a predetermined distance from the most external edges of the porous board 32 is set to be smaller than other areas 32a and 32d (or an inner area 32a and an outer area 32d). Here, in points distinctive from the second embodiment of the present invention, the outer area 32d is provided so as to surround the certain width 32c, the aperture ratio of the certain width 32c being smaller than the aperture ratio of the outer area 32d. Here, as the same with the second embodiment, the aperture ratio is adjustable based on the configuration of a die which molds the porous board 32 in such a manner as to reduce or delete the areas or the number of openings on the certain width 32c. The other areas 32a, 32d where the aperture ratio of the porous board 32 is larger than the aperture ratio of the certain width 32c may either have an identical aperture ratio or a different aperture ratio. The ratio is optionally adjustable by modifying the configuration of the die.

Figure 3B:
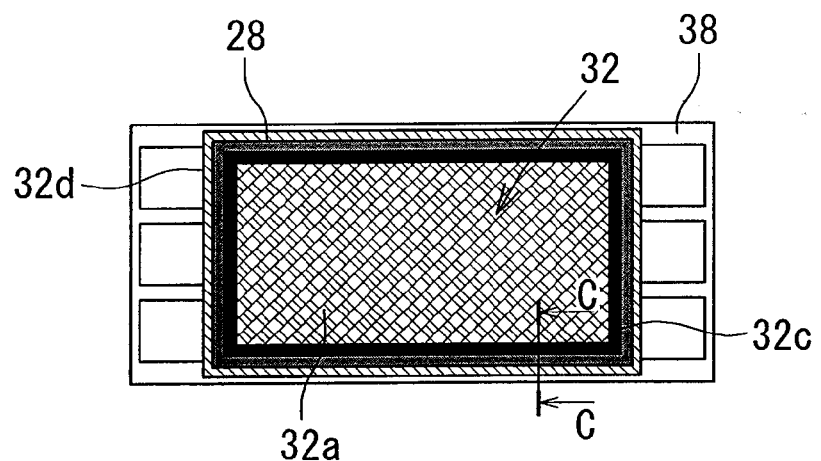
Figure 3C:
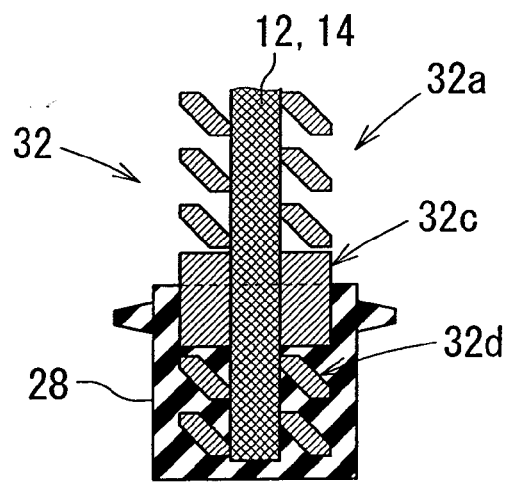

Further, according to the third embodiment of the present invention, as shown in FIGS. 3(b) and 3(c), in a case where a sub-assembly structure that seals peripheries of the porous board 32 with the gasket 28 is applied, the gasket 28 is formed on the porous board 32, that is, from the outer area 32d to the certain width 32c where the aperture ratio is small, whereby it is possible to certainly prevent that components of the gasket 28 travel along the plurality of openings of the gas flow-path formation member so as to infiltrate up to the inner area 32a where the MEA 12 and the gas diffusion layer 14 contributing to generation of electricity are arranged. Accordingly, it is possible to prevent electrode areas from diminishing and to prevent gas diffusibilities from deteriorating so as to circumvent cell performance degradation in electric generation. Still further, at the outer area 32d where the aperture ratio is high, the outer area 32d externally surrounding the certain width 32c where the aperture ratio is low, components of the gasket 28 is infiltrated into the openings so as to be integrally solidified. This so-called anchor effect will improve adhesiveness between the porous board 32 as the gas flow-path formation member and the gasket 28. Explanations of the functional effects that are identical with the first and the second embodiments of the present invention will be omitted.

Referring to FIG. 4, a fourth embodiment of the present invention will be explained hereinafter. Here, components identical with or corresponding to prior arts or the first to the third embodiments are given the same reference symbols, and the detailed explanation thereof will be omitted. In the fourth embodiment of the present invention, when the porous board 32 constructing the gas flow-path formation member 16 according to the first embodiment of the present invention is formed, conductive metal powder 40 is added to raw materials. This addition of the conductive metal powder 40 will further improve conductivity of the porous board 32 so as to reduce specific resistance of the porous board 32. Accordingly, additional treatments such as plating for advancing conductivity will not be necessary. Moreover, since there will be no case that the conductive metal powder 40 contained in the porous board 32 is directly in touch with the inner cell environments, property alteration due to corrosion, etc. will never be caused. Here, explanation of operational effects identical with the first to the third embodiments of the present invention will be omitted. In addition, the conductive metal powder 40 applied in the fourth embodiment may be Au, Pt, Ag, Cu, Fe, Cr, Ni or alloy based on these indicated metals.

Next, a fifth embodiment of the present invention will be explained hereinafter with reference to FIG. 5. Here, components identical with or corresponding to prior arts or the first to the fourth embodiments are given the same reference symbols, and the detailed explanation thereof will be omitted. In the fifth embodiment of the present invention, when the porous board 32 constructing the gas flow-path formation member 16 according to the first embodiment of the present invention is formed, as shown in FIG. 5(a), metal or metallic oxide 42 that is dissolved under the inner cell environments is added into raw materials. Under the inner cell environments, the metal or the metallic oxide 42 added into the raw materials is adapted to be dissolved, whereby holes 44 are formed on the surface of the porous board 32, contributing to expansion of the surface roughness of the porous board 32. Accordingly, hydrophilicity on the surface of the porous board 32 is improved so as to advance the drainage of produced water. Here, it is possible to apply the conductive metal powder 40 according to the fourth embodiment of the present invention to the metal or the metallic oxide 42. However, Au and Pt are not going to be dissolved under the inner cell environments so that they should be excluded, and Fe may be excluded if it gives negative effects to electrochemical reaction. Lastly, explanations of operational effects corresponding to the first to the fourth embodiments of the present invention will be omitted.

Figure 6A:
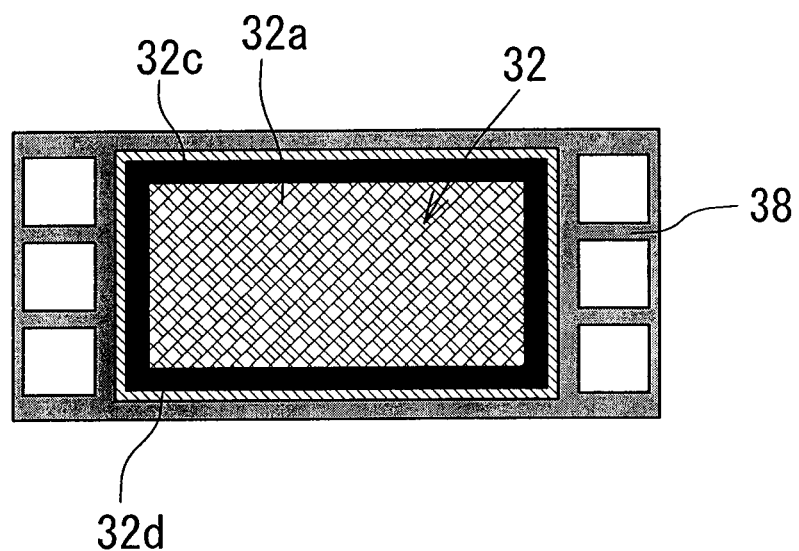
FIGS. 6(a) and 6(b) illustrate a fuel cell according to a sixth embodiment of the present invention wherein a porous board applied to a gas flow-path formation member is shown.
Figure 6B:
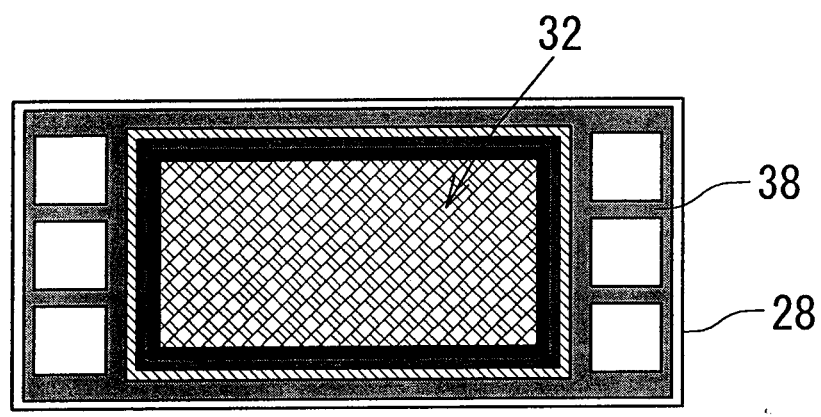

Next, referring to FIG. 6, a sixth embodiment of the present invention will be explained. Here, components identical with or corresponding to prior arts or the first to the fifth embodiments are given the same reference symbols, and the detailed explanations thereof will be omitted. In the sixth embodiment of the present invention, in addition to the formation of the porous board 32 constructing the gas flow-path formation member 16 according to the first embodiment of the present invention, the insulated manifold formation material 38 is individually formed. As shown in FIG. 6(a), the porous board 32 and the manifold formation material 38 are then integrally attached to each other. Here, the method to attach the both members may be optionally selected from double moldings, adhesion, and the like. Here, as shown in FIG. 6(b), a sub-assembly is formed as that the gasket 28 is formed on the region covering both the porous board 32 (the certain width 32c provided at a predetermined distance from the most external edges of the porous board 32 and the outer area 32d, as the same with the third embodiment of the present invention) and the manifold formation material 38. In the above structure, according to rigidity of the manifold formation material 38 fixed to the external edge portions of the porous board 32, rigidity of the cell 10 as a whole will be secured. Further, since the manifold formation material 38 owns insulation properties, it is possible to prevent the other cell components and the porous board 32 from being improvidently shot-circuited through the manifold formation materials 38. Here, explanations of operational effects identical with the first to the fifth embodiments of the present invention will be omitted.

The invention claimed is:

1. A fuel cell with a cell structure including:
a separator; and
a gas flow-path formation member individually provided from the separator, the gas flow-path formation member being arranged within a cell component including the separator, wherein the gas flow-path formation member is a molded piece and contains carbon powder and binder as raw materials, the gas flow-path formation member being a porous board having a plurality of openings that are regularly arranged at least in a gas flow direction as well as in a direction orthogonally crossing the gas flow direction so as to prevent components of a gasket of the fuel cell from traveling along the plurality of openings of the gas-flow path formation member and infiltrating an inner area of the fuel cell that contributes to the generation of electricity, wherein the openings are formed so that an aperture ratio of the openings defined by only a certain region that extends from the most external edges of the gas flow-path formation member slightly towards the center is set to be smaller than other areas, the certain region being definable as a region that entirely surrounds an inner area of the porous board.

2. The fuel cell according to claim 1, wherein the gas flow-path formation member includes burrs that are configured to be removed, and wherein surface roughness of the gas flow-path member is configured to be expanded.

3. A fuel cell with a cell structure including: a separator; and a gas flow-path formation member individually provided from the separator, the gas flow-path formation member being arranged within a cell component including the separator, wherein the gas flow-path formation member is a molded piece and contains carbon powder and binder as raw materials, the gas flow-path formation member being a porous board having a plurality of openings that are regularly arranged at least in a gas flow direction as well as in a direction orthogonally crossing the gas flow direction so as to prevent components of a gasket of the fuel cell from traveling along the plurality of openings of the gas-flow path formation member and infiltrating an inner area of the fuel cell that contributes to the generation of electricity, wherein the openings are formed so that an aperture ratio of the openings defined by only a certain width at a predetermined distance from the most external edges of the gas flow-path formation member is set to be smaller than other areas, the certain width being definable as a width that entirely surrounds an inner area of the porous board.

4. The fuel cell according to claim 3, wherein the gas flow-path formation member includes burrs that are configured to be removed, and wherein surface roughness of the gas flow-path member is configured to be expanded.

* * * * *